(12) United States Patent
Helbach et al.

(10) Patent No.: US 7,264,383 B2
(45) Date of Patent: Sep. 4, 2007

(54) LIGHTING ELEMENT WITH A LIGHT EMITTING DEVICE

(75) Inventors: Wolfgang Helbach, Igensdorf (DE); Dirk-Achim Schevardo, Kainsbach (DE); Thomas Krummer, Weissenburg (DE)

(73) Assignee: Diehl Luftfahrt Elektronik GmbH, Nuremberg (DE)

( * ) Notice: Subject to any disclaimer, the term of this patent is extended or adjusted under 35 U.S.C. 154(b) by 72 days.

(21) Appl. No.: 10/888,715

(22) Filed: Jul. 8, 2004

(65) Prior Publication Data
US 2005/0007791 A1   Jan. 13, 2005

(30) Foreign Application Priority Data
Jul. 9, 2003   (DE) ................ 103 31 075

(51) Int. Cl.
*B60Q 1/00*   (2006.01)
(52) U.S. Cl. ............... 362/471; 362/470; 362/549; 362/800; 362/311
(58) Field of Classification Search ........ 362/471, 362/548, 549, 267, 800, 311, 470
See application file for complete search history.

(56) References Cited

U.S. PATENT DOCUMENTS

| | | | | |
|---|---|---|---|---|
| 4,363,087 A | * | 12/1982 | Graham et al. ........... 362/382 |
| 4,471,414 A | * | 9/1984 | Savage, Jr. ............... 362/652 |
| 5,463,502 A | * | 10/1995 | Savage, Jr. ............... 359/819 |
| 5,593,223 A | * | 1/1997 | Koizumi ................. 362/255 |
| 5,738,437 A | * | 4/1998 | Ilagan .................... 362/363 |
| 6,078,439 A | * | 6/2000 | Silhengst et al. ......... 359/819 |
| 6,127,910 A | * | 10/2000 | Webb et al. ............. 335/205 |
| 6,203,180 B1 | | 3/2001 | Fleischmann |
| 6,280,048 B1 | * | 8/2001 | Luquire .................. 362/125 |
| 6,290,368 B1 | * | 9/2001 | Lehrer ................... 362/187 |
| 2004/0264196 A1 | * | 12/2004 | Shu ....................... 362/294 |
| 2005/0018439 A1 | * | 1/2005 | Schevardo et al. ....... 362/471 |

FOREIGN PATENT DOCUMENTS

| | | |
|---|---|---|
| DE | 41 42 175 A1 | 6/1993 |
| DE | 196 32 699 A1 | 2/1998 |
| DE | 198 43 330 A1 | 3/2000 |
| EP | 0 821 254 A1 | 1/1998 |
| JP | 63 052 491 A | 3/1988 |
| JP | 06 097 509 A | 4/1994 |

* cited by examiner

*Primary Examiner*—Thomas M. Sember
(74) *Attorney, Agent, or Firm*—Laurence A. Greenberg; Werner H. Stemer; Ralph E. Locher

(57) ABSTRACT

A lighting element with a light emitting device preferably in the form of a light emitting diode, can be fitted in a light carrier. The lighting element has a light-transmissive lens body with a lens-shaped light entry surface and a light exit surface and the light exit surface is smaller than the light entry surface. A starry sky lighting configuration for example in an aircraft cabin, can be implemented with a plurality of such lighting elements.

16 Claims, 3 Drawing Sheets

LIGHTING ELEMENT WITH A LIGHT EMITTING DEVICE

BACKGROUND OF THE INVENTION

Field of the Invention

The invention concerns a lighting element with a light emitting device, preferably a light emitting diode.

Published, Non-Prosecuted German Patent Application DE 198 43 330 A1, corresponding to U.S. Pat. No. 6,203,180, discloses an aircraft cabin lighting configuration containing a plurality of light sources in point form which are mounted to or in the ceiling of the aircraft cabin. The light sources in point form have at least one light emitting diode which each irradiate their light directly into the interior of the aircraft cabin.

Published, Non-Prosecuted German Patent Application DE 196 32 699 A1 discloses an optical fiber-based orientation display in which light is applied to optical fibers by at least two light emitting diodes and surface changes at the longitudinal side of the optical fiber result in an emission of light in the form of dashes, lines, points, symbols and the like for the purposes of a marking effect.

Published, Non-Prosecuted German Patent Application DE 41 42 175 A1 describes a display device for aircraft, which has flat light guide elements, in the edge of which light emitting diodes are disposed in rows.

The lighting elements in accordance with the above-outlined state of the art suffer from the disadvantage that the lighting area thereof is of a given minimum size.

SUMMARY OF THE INVENTION

It is accordingly an object of the invention to provide a lighting element with a light emitting device which overcomes the above-mentioned disadvantages of the prior art devices of this general type, whose lighting area is particularly small.

With the foregoing and other objects in view there is provided, in accordance with the invention, a lighting element for fitting into a light carrier. The lighting element contains a light emitting device and a light-transmissive lens body disposed downstream of the light emitting device. The light-transmissive lens body has a lens-shaped light entry surface and a light exit surface. The light exit surface is smaller than the lens-shaped light entry surface.

The core of the invention provides that a lighting element of the general kind set forth has a light-transmissive lens body, preferably containing a transparent plastic material such as for example polycarbonate, and a lens-shaped light entry surface and a light exit surface. The light exit surface is of any small size whatever but at any event is smaller than the light entry surface.

That configuration provides that the lighting surface of the lighting element can be of any small size whatever and in particular is also smaller than the light emitting device.

Preferably the light entry surface of the lens body is shaped in such a way that the light that penetrates into the lens body from the light emitting device is deflected on to the light exit surface. That focusing effect provides that, in spite of its small extent, the lighting surface lights up sufficiently brightly.

It can further be provided that the lighting element is fitted into the light carrier in such a way that the light exit surface of the lens body is flush with the surface of the light carrier, thereby providing that the light exit surface is almost invisible when the light emitting device is switched off.

The light exit surface of the lens body can also be flat and/or roughened ('ground') and it can be circular, triangular or polygonal or also of any other shape. In addition the light emitting device should be disposed in the lighting element in such a way that a large part of the light emitted thereby impinges on the light entry surface of the lens body.

In a development of the invention it can be provided that the light emitting device is fixed on and wired to a circuit board disposed in the lighting element, the light emitting device preferably being in the form of an SMD light emitting diode.

Equally the lens body can be integrated into a lighting element body which contains the same material as the lens body and which accommodates the light emitting device. Preferably in that case the lens body and the lighting element body are in one piece.

A configuration of the invention provides that the lighting element or the lighting element body has a guide, which is preferably provided with an abutment, for the light emitting device and/or for the circuit board and/or an opening for the feed of an electrical cable into the lighting element or the lighting element body.

The light emitting device and/or the circuit board can be at least partially cast with silicone in the lighting element and thus can be releasably fixed therein.

A further configuration of the invention provides that the lighting element or the lighting element body is held in a sleeve or socket that is fitted in the light carrier. In that case the light exit surface of the lens body, the end face of the sleeve and the surface of the light carrier are flush with each other in order to make the light exit surface virtually invisible when the lighting element is switched off.

The lighting element or the sleeve can be glued in the light carrier. The ceiling or wall of an aircraft cabin can serve as the light carrier. The light emitting diode preferably emits white light and can be operated with uniform brightness, flashing or also flickering (lighting up more brightly—lighting up more darkly). The lighting element can be part of a starry sky lighting configuration.

Other features which are considered as characteristic for the invention are set forth in the appended claims.

Although the invention is illustrated and described herein as embodied in a lighting element with a light emitting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
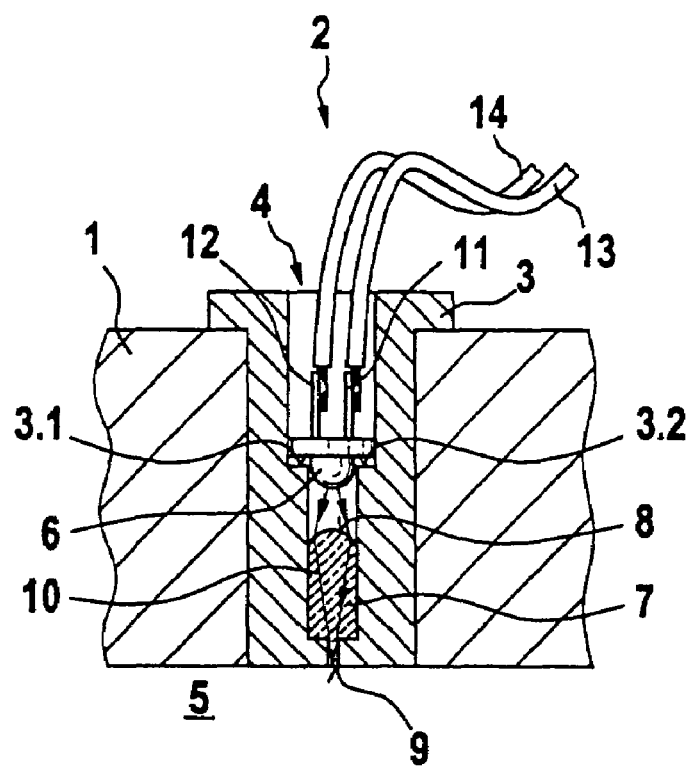
FIG. 1 is a diagrammatic, cross-sectional view of a first embodiment of an installed lighting element according to the invention.

Referring now to the figures of the drawing in detail and first, particularly, to FIG. 1 thereof, there is shown a lighting element 2 installed in a ceiling panel 1 of an aircraft cabin in a suitable bore. The lighting element 2 includes a shaped plastic portion 3 having a bore 4 which in the upper region is of a large diameter, then adjoining it a medium diameter and, in the lower region which is towards an interior 5 of the aircraft cabin, a small diameter of about 1 mm. A light emitting diode 6 is fitted into the bore 4 of the shaped plastic body 3 in such a way that it is held by the transition from the region of the wide diameter into the region of the medium diameter of the bore 4 approximately at the middle of the shaped body 3 (steps 3.1 and 3.2). Beneath the light emitting diode 6, fitted in the bore 4 is a light-transmissive lens body 7 formed of a transparent plastic material, having a light entry surface 8 which is curved upwardly in a lens-shaped configuration and a flat light exit surface 9. The configuration of the light emitting diode 6 and the lens body 7 as well as the shape of the light entry surface 8 are such that the light emitted by the light emitting diode 6 (see beam path 10) is focused and deflected to the light exit surface 9 of the lens body 7. The electrical connection of the light emitting diode 6 is made by the connecting leg portions 11 and 12 thereof and by way of cables 13 and 14 which are soldered or welded thereto.

Figure 2:
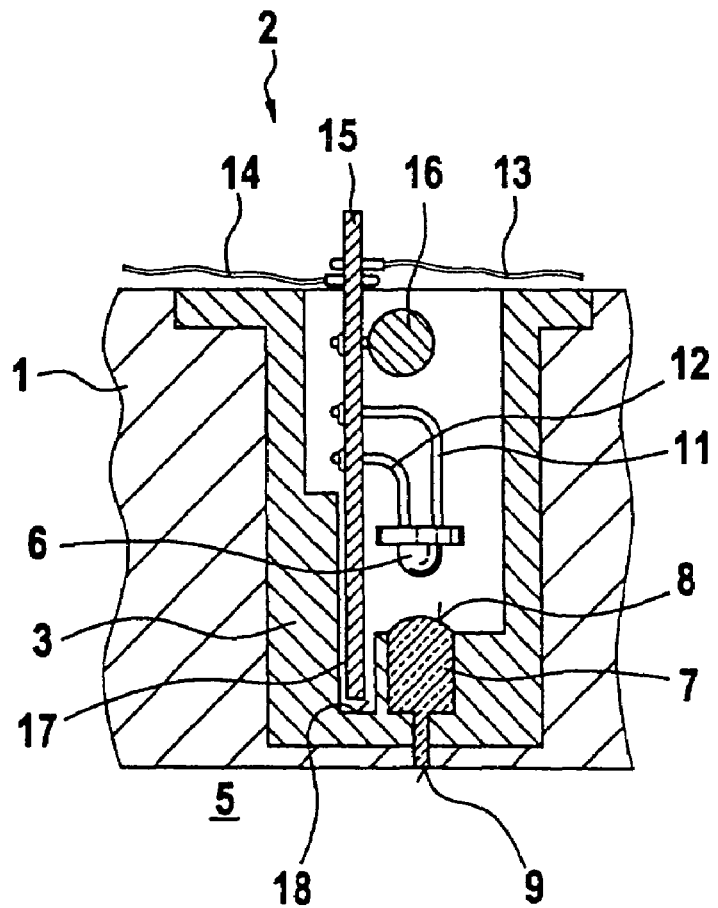
FIG. 2 is a diagrammatic, cross-sectional view of a second embodiment of the lighting element.

In the embodiment shown in FIG. 2 the light emitting diode 6 is fixed and wired to a circuit board 15 with the portions 11 and 12 of the light emitting diode 6. The circuit board 15 further carries inter alia an ESD protection diode 16 and is fitted into a guide 17 provided in the shaped plastic portion 3. The guide 17 has an abutment 18 which, by virtue of defined positioning of the circuit board 15 in the lighting element 2, provides that the light emitting diode 6 is disposed at the optimum spacing and in the optimum position with respect to the lens body 7.

Figure 3:
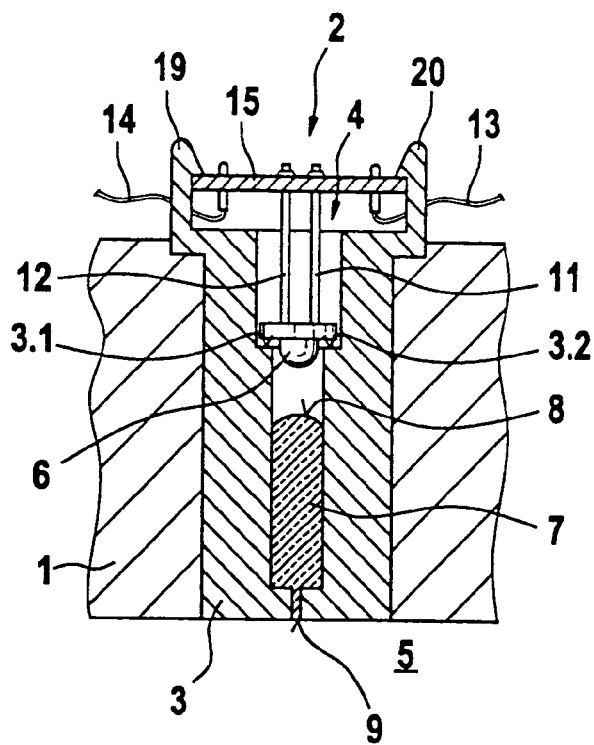
FIG. 3 is a diagrammatic, cross-sectional view of a third embodiment of the lighting element.

In the embodiment shown in FIG. 3 the circuit board 15 is not oriented parallel but perpendicularly to an optical axis. The light emitting diode 6 which is fixed and connected with its leg portions 11 and 12 to the circuit board 15 rests on the steps 3.1 and 3.2 in the bore 4 in the shaped body 3. Latching hooks 19 and 20 which are formed in one piece on the shaped body 3 engage behind the circuit board 15 and thus prevent the circuit board 15 and the light emitting diode 6 from falling out of the lighting element 2. Connecting cables 13 and 14 are taken past the latching hooks 19 and 20.

Figure 4:
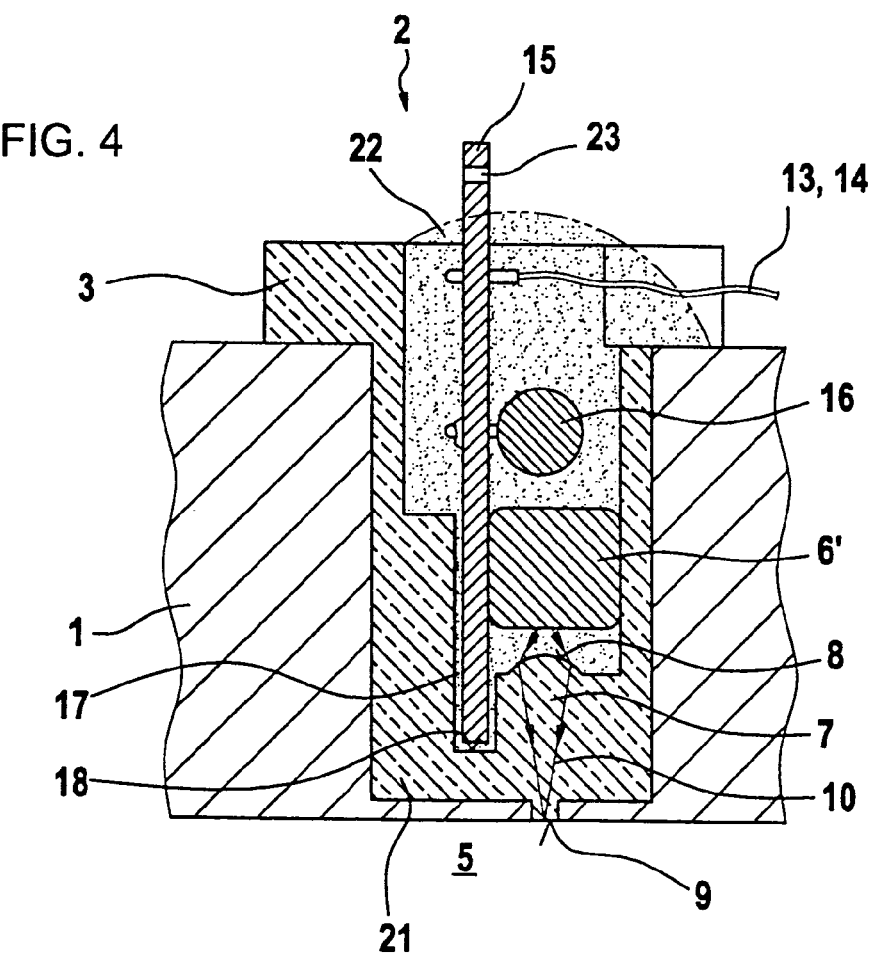
FIG. 4 is a diagrammatic, cross-sectional view of a fourth embodiment of the lighting element.

In the embodiment shown in FIG. 4 the shaped body 3 and the lens body 7 are in one piece in the form of a lighting element body 21 that as a whole is formed of a light-transmissive plastic material. In addition the light emitting device 6 is in the form of a SMD light emitting diode 6' which provides for lateral light emission. The connecting cables 13 and 14 are passed through bores or openings in the lighting element body 21. The free internal space in the lighting element body 21 is sealed with vinegar-free silicone as a casting material 22. At its upper end the circuit board 15 has a withdrawal hole 23 with which the circuit board 15 together with the light emitting diode 6', the mounted electronic configuration 16 and the connecting cables 13, 14 as well as the casting material 22 can be withdrawn from the lighting element body 21. That makes it easily possible to replace the light emitting diode 6'.

Figure 5A:
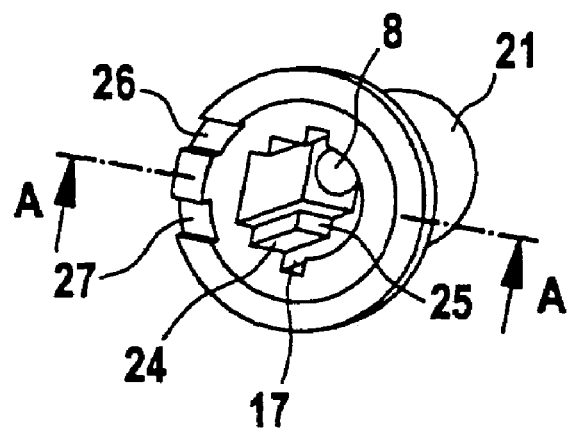
FIG. 5A is a diagrammatic, perspective view of a fifth embodiment of the lighting element.

FIG. 5A shows a perspective view of the lighting element body 21 of a fifth embodiment of the lighting element 2. It is possible to see in FIG. 5A the guide 17 for the circuit board 15 and a guide 24 for the SMD light emitting diode 6'. The guide 24, like the guide 17, has an abutment 25 for defined positioning of the light emitting diode 6' with respect to the light entry surface 8 of the lighting element body 21. It is also possible to see cable exit openings 26 and 27.

Figure 5B:
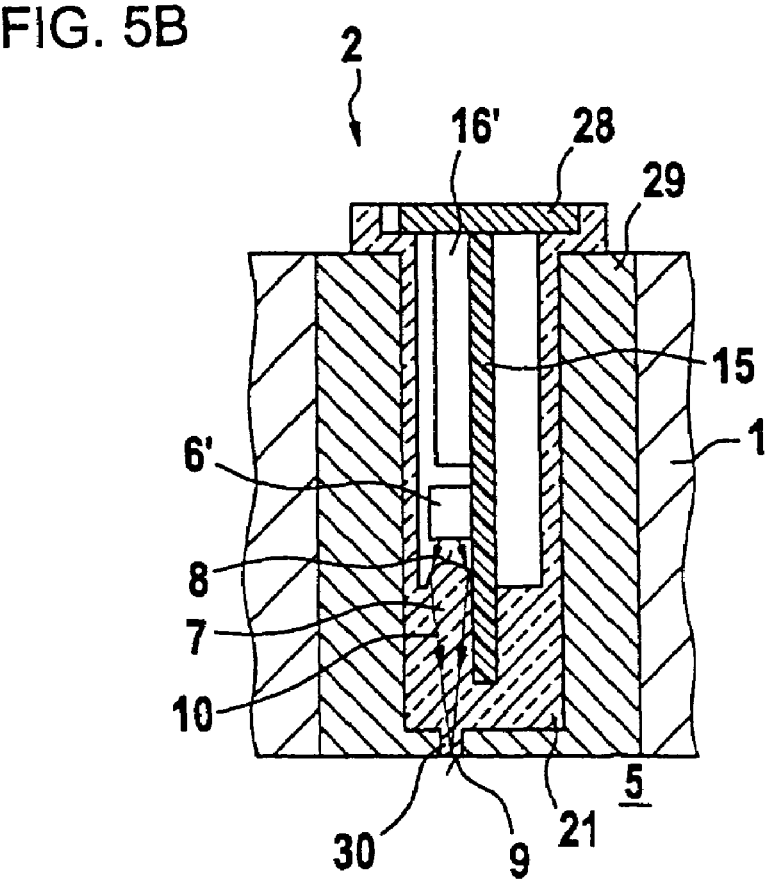
FIG. 5B is a diagrammatic, cross-sectional view taken along line VB-VB of the lighting element shown in FIG. 5A.

FIG. 5B shows the complete lighting element 2 using the lighting element body 21 of FIG. 5A in cross-section taken along the line VB-VB.

An electronic interference suppression or actuation configuration 16' for the SMD lighting emitting diode 6' is fixed on and connected to the circuit board 15. The interior of the lighting element 2 or the lighting element body 21 is closed by a closure cap 28. The lighting element body 21 is glued in a socket or sleeve 29 that is glued in a bore in the aircraft cabin ceiling 1. In the central and upper parts the sleeve 29 has a wide bore for receiving the lighting element body 21 but in the lowermost part it has only a very narrow bore which only allows a light exit portion 30 of the lighting element body 21 to pass therethrough.

The features set forth in the various embodiments can be combined together in any manner without thereby departing from the scope of the invention. Thus the lighting element can be disposed in flush relationship for example both with respect to the top side and also with respect to the underside of the ceiling panels of the aircraft cabin, wherein the light exit surface of the lighting element, the end face of the sleeve and the surface of the ceiling panels are preferably again disposed flush with each other. The light exit surface of the lighting element can be flat or also of a roughened configuration. The latter provides that the light issuing from the lighting element is scattered in various directions, whereby the light point produced by the light exit surface is visible from all directions (therefore even at very shallow viewing angles) from the interior 5 of the aircraft cabin.

This application claims the priority, under 35 U.S.C. § 119, of German patent application No. 103 31 075.4, filed Jul. 9, 2003; the entire disclosure of the prior application is herewith incorporated by reference.

We claim:

1. A lighting element for fitting into a light carrier, the lighting element comprising:
  a light emitting device;
  a light-transmissive focussing lens body disposed downstream of said light emitting device, said light-transmissive focussing lens body having a lens-shaped light entry surface and a light exit surface, said light exit surface being smaller than said lens shaped light entry surface;
  a lighting element body accommodating said light emitting device, said light-transmissive focussing lens body integrated into said lighting element body and formed of a same material as said lighting element body, said light-transmissive focussing lens body and said lighting element body formed as a one-piece unit.

2. The lighting element according to claim 1, wherein said lens-shaped light entry surface is shaped such that light penetrating into said light-transmissive focussing lens body from said light emitting device is deflected onto said light exit surface.

3. The lighting element according to claim 1, wherein said light emitting device is disposed such that a large part of light emitted by said light emitting device impinges on said lens-shaped light entry surface of said light-transmissive focussing lens body.

4. The lighting element according to claim 1, wherein said light exit surface of said light-transmissive focussing lens body is at least one of flat and roughened.

5. The lighting element according to claim 1, further comprising a circuit board, said light emitting device being fixed on and connected to said circuit board, said light emitting device being a surface mounted light emitting diode.

6. The lighting element according to claim 5,
further comprising a first guide with an abutment for defining a positioning of said light emitting device;
wherein said lighting element body has a second a guide with an abutment for positioning said circuit board; and
wherein said lighting element body has an opening formed therein for feeding an electrical cable into said lighting element body.

7. The lighting element according to claim 5, wherein said light emitting device and/or said circuit board are at least partially cast with silicone in the lighting element and are releasably secured in the lighting element.

8. The lighting element according to claim 5, wherein said lighting element body has a guide with an abutment for receiving and positioning said circuit board.

9. The lighting element according to claim 5, further comprising:
a first guide with an abutment for positioning said light emitting device; and
a second guide with an abutment for positioning said circuit board.

10. The lighting element according to claim 1, wherein the light carrier is a ceiling or wall of an aircraft cabin, and said light emitting device emits white light.

11. The lighting element according to claim 10, wherein the lighting element is part of a starry sky lighting configuration.

12. The lighting element according to claim 1, wherein said light emitting device is a light emitting diode.

13. The lighting element according to claim 1, wherein said light-transmissive focussing lens body is formed of a transparent plastic material.

14. The lighting element according to claim 1, wherein said light emitting device has a guide with an abutment for defining a positioning of said light emitting device.

15. The lighting element according to claim 1, wherein said lighting element body has an opening formed therein for feeding an electrical cable into said lighting element body.

16. A lighting element for fitting into a light carrier, the lighting element comprising:
a light emitting device;
a light-transmissive focussing lens body disposed downstream of said light emitting device, said light-transmissive focussing lens body having a lens-shaped light entry surface and a light exit surface, said light exit surface being smaller than said lens-shaped light entry surface, the lighting element is fitted into the light carrier such that said light exit surface of said light-transmissive focussing lens body is flush with a surface of the light carrier, said light-transmissive lens body having lateral surfaces extending perpendicular to said light exist surface for allowing said light-transmissive lens body to be axially displaceable and adjustable for allowing said light exit surface to be flush with the surface of the light carrier.

* * * * *